United States Patent Office 3,255,065
Patented June 7, 1966

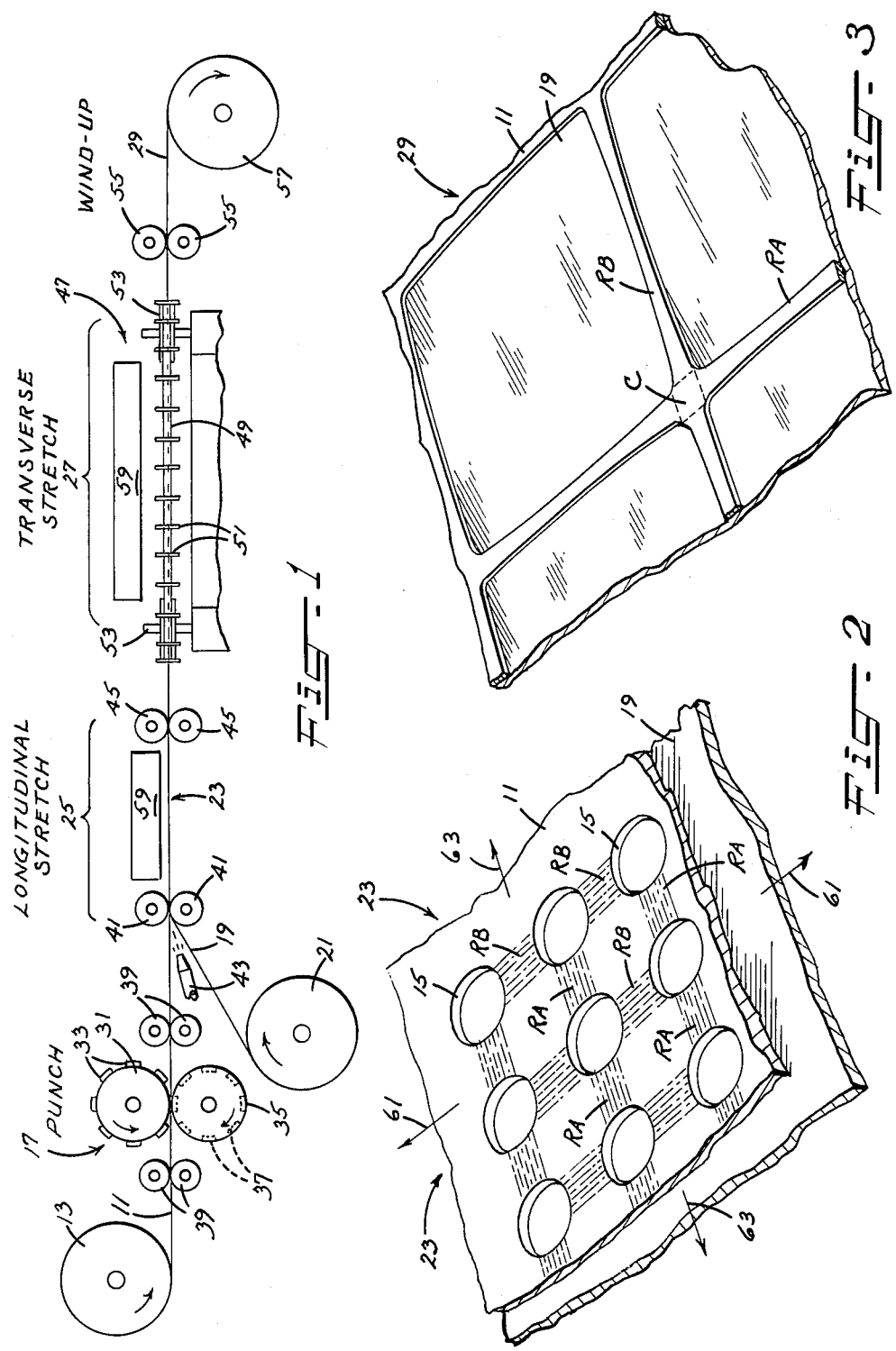

3,255,065
METHOD FOR MAKING A COMPOSITE FILM
Harold W. Wyckoff, Middletown Township, Delaware County, Pa., assignor, by mesne assignments, to FMC Corporation, San Jose, Calif., a corporation of Delaware
Original application June 2, 1961, Ser. No. 114,418. Divided and this application July 12, 1962, Ser. No. 209,342
12 Claims. (Cl. 156—229)

The present invention relates to the manufacture of films or sheets from thermoplastic polymeric materials, and particularly to oriented films which possess high strength and desired stiffness or rigidity along selected directions.

This application is a division of my application Serial No. 114,418 which was filed on June 2, 1961.

In the conventional manufacture of films from polymeric materials, as for example from ethylene or propylene polymers, the molten polymer is extruded as a continuous sheet and is then rapidly quenched, as for example by a cooling liquid or gas. To convert this film into more useful article, the film is generally oriented by being stretched in two mutually perpendicular or biaxial directions to form a substantially balanced and superior film in which the physical properties, such as tensile strength, elongation, etc., are substantially the same as measured along biaxial directions. The stiffness of the films formed by this known procedure is substantially the same along both directions of orientation, and is primarily dependent upon the cross-sectional thickness of the film after stretching thereof.

Broadly, the present invention is concerned with a method for making oriented films from thermoplastic polymeric materials wherein the polymeric material itself is geometrically arranged to provide the film with desired stiffness without sacrificing film continuity or covering power. Instead of providing all portions of the film with a uniform thickness for achieving a desired degree of film stiffness, as in films of conventional construction, the film of the present invention is of composite construction which includes an unbroken oriented web or skin of sufficient thickness for satisfying load requirements, and an integral network of uniaxially oriented ribs which imparts desired stiffness to the film. Since the web or skin of the composite polymeric film of the present invention is not primarily relied upon for imparting stiffness to the film, such web will be of substantially less thickness than that of a conventional polymeric film having similar strength characteristics. Geometrically arranging polymeric material into a network of ribs, on the other hand, provides a structure which is more favored from the standpoint of stiffness than a continuous web of uniform thickness. Thus, in comparing the composite film made in accordance with the present invention with a conventional polymeric film of equal strength, employing a web or skin of less thickness permits a greater amount of polymeric material to be geometrically arranged into an integral network of ribs, thereby resulting in a composite film having a greater stiffness than a conventional film formed of an equal amount of polymeric material. Stated differently, with the requirement of a thinner web or skin for satisfying strength considerations, and the improved stiffness achieved with an integral network of ribs, a composite film having the strength and stiffness of a corresponding conventional film of uniform thickness could be produced with less polymeric film-forming material.

The term "ribs" as employed hereafter throughout the description and claims refers to those portions of polymeric material remaining between the openings of the perforated web which are actually or are capable of being uniaxially drawn in accordance with the method of the present invention. Further, the term "drawn" is intended to mean that orientation of the molecules of polymeric material is achieved by the application of a stretching force, with the molecular orientation being generally parallel to the direction of the applied force. As more fully described hereafter, the drawing action may be effected along one or both of the longitudinal and transverse axes of the laminated webs, either in independent stages or simultaneously, using conventional cold or hot drawing methods and apparatus which are suitable for the particular polymeric materials from which the film is formed.

A primary object of the present invention is to provide a generally new or improved and more satisfactory method for providing oriented polymeric films having high strength and desired stiffness along selected directions.

Another object is to provide a method for making a polymeric film having stiffening ribs in which the molecules of the film and at least certain of the ribs are oriented along at least one axial direction.

A more specific object is the provision of a method wherein at least one continuous and unbroken web of thermoplastic polymeric material is laminated with a perforated web of like material and then stretched to provide a composite film in which the molecules of selected portions of the laminated webs are oriented along at least one axial direction, and wherein the portions of perforated web serve as reinforcing or stiffening ribs.

These and other objects and advantages of the invention will be apparent from the following description and accompanying drawing in which:

FIGURE 1 is a diagrammatic view illustrating the method of the present invention;

FIGURE 2 is a perspective view of a portion of a laminated web structure employed in the practice of the method of the present invention; and FIGURE 3 is a view similar to FIGURE 2 illustrating a portion of a composite film formed by the method illustrated in FIGURE 1.

Preferably, and in general, the method of making the composite film of the present invention involves laminating, or otherwise uniting, an unbroken and unoriented web of thermoplastic polymeric material with a similar web having a series of openings or perforations disposed in a predetermined pattern, followed by stretching of the laminated structure along biaxial directions. As a result of the stretching operation, the portions of the unbroken web which extend across the openings in the perforated web are biaxially oriented and thus possess good strength characteristics, while at least selected ribs of the perforated web and the portions of the unbroken web attached thereto are uniaxially oriented and impart desired stiffness into the composite film.

During the stretching operation, the ribs of the perforated web, and the portions of the unbroken web directly attached thereto, are progressively oriented in the direction of the applied stretching fore or forces; that is, with uniaxial drawing in each successive group of parallel ribs occurring simultaneously and extending to a predetermined degree along such ribs before drawing starts in an adjacent group of ribs in series therewith. To insure proper stretching, two basic requirements must be met as follows: (1) ribs which are to draw in parallel with each other must be capable of being drawn to substantially the same amount, and (2) ribs which are to be drawn in series with each other must be of comparable cross-section so that stretching will be initiated in a group of undrawn ribs after drawing is completed in an adjacent group of ribs and before such drawn ribs are stretched beyond their breaking point or a predetermined point compatible with other drawing which is to be or has been accomplished.

The relationship between the spacing and size and/or shape of the openings in the perforated web is of critical importance from the standpoint of isolating the effects of the stretching forces to the ribs themselves so that undrawn junctures remain between the uniaxial drawn ribs. Basically, the configuration of the openings formed in the web of polymeric material are such that each web has a narrow part and is of greater width at the areas adjacent to the junctures between ribs. Thus, as such rib is subjected to a stretching force, the narrow part thereof yields initially after which drawing of the rib continues progressively in opposite directions therefrom. As the rib is being drawn along its wider portions, the force necessary to maintain this drawing action progressively increases until it equals and exceeds the force under which an adjacent undrawn rib in series therewith yields and starts to stretch.

In accordance with the present invention, each group of parallel ribs of the perforated web, and the portions of the unbroken web attached thereto, are drawn to a predetermined degree before another group of undrawn ribs in series therewith starts to yield. The degree to which the ribs of each group of parallel ribs are drawn during this stage may be such as to stretch the ribs to their maximum allowable extent; that is, without inducing stretching in the junctures between the ends of adjacent ribs. Alternatively, such ribs may be only partially drawn during this stage and may be further drawn to their maximum allowable extent after partial stretching is completed in all such groups of parallel ribs. Once the maximum allowable stretch is induced in each of such ribs, the line defining the end of a drawn rib, hereafter referred to as the "draw-line," will have approximately the maximum length possible without having the juncture between the ends of the adjacent ribs stretched and without having the draw-line of one rib interfere or cross with the draw-lines of other ribs at such junctures. The load required to achieve such draw-line of optimum length must be less than the breaking load of ribs which are fully drawn so that substantially complete orientation can be effected in the ribs undergoing stretch. Further, when a single stretching operation is employed for inducing the maximum allowable stretch in the individual ribs, the draw load required to achieve this result is preferably slightly greater than the yield load of an undrawn rib in series therewith so that such undrawn rib will stretch before drawing extends into the web junctures.

When considering a typical force-elongation curve of a uniform strip of one specified thermoplastic polymeric web under cold drawing conditions, as for example a web formed of polypropylene, the yield load or the load necessary to initiate stretching of the strip will generally be about 1.4 times as great as the draw load or the load required to maintain drawing once such strip has yielded, while the breaking load of a drawn strip will be approximately twice the draw load. As hereafter employed throughout the description and claims the terms "yield load," "draw load" and "breaking load" refer, respectively, to the loads required for initiating, maintaining, and rupturing the ribs at their narrowest section. Thus with ribs of proper shape, drawing of the series of parallel ribs will be self-regulating so that drawing will be initiated in one group of parallel ribs when the load applied to an adjacent series of such ribs is approximately 1.4 times the draw load. When such ribs are subjected to only a single operation, the maximum allowable draw will be achieved when the applied load is equal to approximately 1.4 times the draw load. Maximum orientation of the polymer molecules is achieved, however, when the load applied to the ribs approaches the breaking load. Thus, when ribs of optimum strength are desired, stretching is effected in two stages, as heretofore mentioned, with the applied load being equal to about 1.4 times the draw load during the initial stretching operation and approximately or slightly less than twice the draw load during the final stretching operation.

As heretofore mentioned, these desired self-regulating conditions and optimum stretch characteristics are obtained by shaping the ribs of the perforated web so that each has a narrow part and widens out at the junctures between the ends of adjacent ribs. Preferably, the ratio of the widest parts of the rib, at which a draw-line of maximum length is obtained, to the narrowest part thereof, hereafter referred to as the width ratio, should be substantially equal to or slightly greater than the ratio of the yield load to the draw load. With a width ratio which exceeds the yield to draw load ratio, less than maximum orientation will be imparted to a rib being stretched during an initial stretching operation when a rib in series therewith starts to yield. As heretofore mentioned and more fully discussed hereafter such conditions are desired and necessary when drawing of the ribs to their maximum allowable extent is to be effected by two independent stretching operations. On the other hand, if the width ratio of the rib is substantially less than the yield to draw load ratio, drawing of one rib will continue into the juncture between the ends of adjacent ribs before yielding is initiated in an undrawn rib in series therewith.

To satisfy the above noted requirements, it will be apparent that the spacing and size and/or shape of the openings formed in the web must be properly correlated. As to the shape of the openings, openings having sharp corners at which stresses are likely to concentrate, particularly during drawing, should be avoided to minimize tearing of the web. Suitable openings of the simplest shape would, of course, be round, elliptical or rectangular with rounded corners, while openings of more complex configuration may be, for example, hexagonal or octagonal with rounded corners or may be comprised of a number of arcuate surfaces, such as found in a clover-leaf design. As will be more apparent hereafter, the web openings may be formed in various combinations or patterns, so as to provide the finished composite film with desirable qualities from the standpoint of appearance and/or function as well as stiffness.

As heretofore mentioned, conventional film stretching apparatus may be employed for effective the desired orientation of the laminated web either under cold drawing conditions; that is, at room temperature, or under hot drawing conditions wherein the laminated webs are heated to enhance plastic flow without actually rendering the polymeric material from which they are formed completely molten. The drawing conditions, and particularly the temperature during drawing, will of course vary with the particular polymeric materials from which the webs are formed and, to some degree, with the characteristics desired in the finished product. For example, when drawing a perforated web of polypropylene at elevated temperatures, necking of the ribs, particularly at the draw-line, is less pronounced than that which is achieved under cold drawing conditions.

Drawing of the laminated webs may be effected along one or both of their longitudinal and transverse axes. Further, while the ribs in any one group of parallel ribs of the perforated web must be capable of being drawn to substantially the same degree, the groups of parallel ribs in series therewith may be of different cross-sectional size, so that only selected groups of parallel ribs will yield under the applied forces, or of different shape so that the resulting composite film will include ribs of different lengths. Further, while laminating of a perforated web onto at least one side of an unbroken web is desired from the standpoint of simplicity and ease of manufacture, a structure suitable for stretching may be provided, for example, by actually casting a net-like arrangement of polymeric material onto or integrally with the unbroken web itself.

The present invention is applicable to the manufacture of composite films from all thermoplastic materials, the molecules of which may be oriented by stretching. In general, the polymeric material employed, the thickness of the unbroken film, and the number, size, and positioning of the stiffening ribs will depend upon the application for which the composite film is intended. The composite films may be used, for example, in place of canvas and other fabric or plastic materials in tents and other similar structures; as protective covering or shields as over swimming pools, in building construction and as storm windows; as a wrapping or bagging material; and in the fabrication of shaped inflatable structures, such as, weather observation balloons, life rafts, emergency markers and buoys, etc.

For a more detailed description of the method of the present invention, reference is made to FIGURE 1 of the drawing wherein an unoriented web 11 of thermoplastic polymeric material, as for example polypropylene, is drawn from a supply roll 13 and provided with a predermined pattern of openings 15 as by a gang punch 17. This perforated web is then laminated with an unbroken and unoriented web 19 which is drawn from a supply roll 21 and is formed of polymeric material which may be the same or different from that of the web 11. The laminated web structure, shown at 23, is then stretched along its longitudinal and transverse directions, either simultaneously or in independent operations, as illustrated at 25 and 27, to provide a composite film 29, a portion of which is shown in FIGURE 3.

The gang punch 17 is of conventional construction and includes a cutter roll 31 having a sereis of projecting punches 33, an anvil roll 35 having openings 37 which are aligned to receive the punches 33 and means, not shown, for driving the rolls 31 and 35 at a uniform and equal rate of speed in opposite directions as indicated. Pairs of nip rolls 39 are provided along opposite sides of the gang punch 17 for maintaining the web 11 taut during the punching thereof and are preferably driven by known means, not shown, to effect positive film advancement.

The webs forming the supply rolls 13 and 21, and particularly the surfaces thereof which are to be positioned in contacting relationship, are of course, pretreated when necessary to facilitate a bond therebetween. Such pretreatment may include, for example, subjecting the films to an electric glow discharge to render the same receptive to adhesives, coating of the film surfaces, or both. With webs 11 and 19 formed of polypropylene for example, the opposing web surfaces may be subjected to an electric glow discharge and may be bonded to each other as they pass between nip rolls 41, as by a layer of adhesive sprayed onto the treated surfaces by one or more nozzles 43. Alternatively, such pretreated web surfaces may be coated with a heat-sealable material before being wound into supply rolls, with such coating being subsequently activated by hot gases, supplied by nozzles 43.

Stretching of the laminated structure 23 in a longitudinal direction may be achieved by a pair of draw rolls 45 which are rotated at a speed greater than that of the rolls 41 by suitable means, not shown. Once longitudinal stretching is completed, the laminated structure 23 is passed into a tenter frame 47 which is of conventional construction and includes a pair of endless belts 49, a series of clips 51 secured to the belts at spaced intervals and a pair of drums 53 for directing the endless belts 49 along diverging paths, with at least one drum of each pair of drums 53 being driven. Upon entry into the tenter frame 47, the laminated structure 23 is engaged along its longitudinal edges by the clips 51 and is simultaneously advanced and stretched in a transverse direction as the endless belts 49 are moved along their diverging paths. The resulting composite film 29 is then advanced by nip rolls 55 to a wind-up reel where it is collected as a roll 57.

As heretofore mentioned, drawing of the laminate web structure 23 in either a longitudinal or transverse direction, or both, may be effected at room temperature as a cold drawing operation, or alternatively, the structure 23 may be heated, as by lamps 59, to enhance plastic flow without actually rendering the polymeric material of either web completely molten.

With the openings 15 in the perforated web 11 being spaced such as to provide ribs with a width ratio which is substantially equal to the yield to draw ratio of the particular polymeric material employed, stretching of the laminated structure 23 longitudinally, as indicated by arrows 61 in FIGURE 2, causes the groups of parallel ribs RA of the web 11, and the portions of the web 19 secured thereto, to be sequentially drawn, with the drawing of one group of parallel ribs being substantially completed before drawing is initiated in a group of parallel ribs RA in series therewith. During this stretching operation, the individual ribs RA initially yield at their narrowest part WA and then continue to be progressively drawn in opposite directions therefrom. As this drawing action proceeds it extends into the wider portions of the individual ribs and the stretching load applied to the laminated structure 23 is progressively increased until the ribs RA are drawn to substantially their widest parts WB. At this stage the applied stretching load is at least equal to or exceeds the load under which an adjacent series of undrawn ribs RA start to yield so that further stretching of the drawn ribs ceases while drawing is initiated and continued in the undrawn ribs in series therewith. It will be noted that under these conditions, the drawing action is self-regulating in that the load required to continue drawing of a rib beyond its widest part; that is beyond its allowable maximum extent, is greater than the load under which an adjacent undrawn rib will yield at its narrowest part.

Simultaneously with the drawing of the ribs RA, and the portions of the web 19 directly secured thereto, the portions of the web 19 which extend across the openings 15 in the web 11 are also drawn in the direction of the applied stretching force 61, and to substantially the same degree as the ribs RA.

As the longitudinally stretched laminated structure is passed into the tenter frame and stretched in a transverse direction, as indicated by the arrows 63 in FIGURE 2, the ribs RB of the web 11, and the portions of the web 19 directly secured thereto, are drawn in the same manner as described above with respect to the ribs RA. While the applied transverse stretching forces have no effect on the longitudinally drawn ribs RA, they do effect transverse stretching of the portions of the web 19 which extend across the opening 15 in the web 11 so that these areas of the resulting composite film 29 are biaxially oriented. From the finished composite film shown in FIGURE 3, it will be noted that the terminal portion of the drawn ribs RA and RB between adjacent pairs of openings define a juncture C in which no orientation has been effected. These undrawn junctures, as heretofore mentioned, assist in maintaining the independent and transverse drawing forces confined to the respective ribs RA and RB and also serve to make the composite film 23 more resistant to tearing.

As heretofore mentioned, the ribs RA and RB of the web 11 may be each drawn to their maximum allowable extent in two separate stretching operations, the latter of which is applied, in each case, after the initial stretching of all of the respective ribs RA and RB is completed. In this case, the openings 15 in the web 11 are located closer to each other than in the arrangement described above to provide ribs RA and RB with a width ratio which is greater than the ratio of the yield to draw load but at least slightly less than the breaking load to drawing load ratio of the particular polymeric material employed. Thus, during the initial stretching operation, yielding is initiated in each group of parallel ribs before the ribs in series therewith are drawn to their maximum allowable extent. Once the laminated structure 23 has been drawn so that initial stretching of all of the ribs RA and RB of the web 11 is completed, the structure 23 may be then subjected to further stretching to thereby draw the ribs to the same degree. It will be apparent that the ribs RA and RB having a width ratio which approaches the breaking load to the drawing load ratio, the load required to effect the maximum allowable drawing in the respective ribs during the second stretching operation will be slightly less than the load under which such drawn ribs would break. Thus under these conditions maximum orientation and therefore optimum strength is imparted to the respective ribs.

The degree of stretching may also be varied with typical stretch ratios, in both the longitudinal and transverse directions, ranging for example from 1.5 to 1 up to 20 to 1 or higher. It will be understood, of course, that the draw ratios need not be the same in both longitudinal and transverse directions. Further, the spacing and/or width of the ribs extending longitudinally of the web 11 may differ from that of the transversely extending ribs to provide greater strength and stiffness to the composite film along a particular axis of orientation. As a further alternative, the spacing and/or width of the ribs may be varied along either one or both axes of orientation to provide, for example, a composite film in which the edges are stronger and stiffer than its central portion. If desired, the unbroken web 19 may be uniaxially oriented, as for example along its longitudinal axis, before being bonded to the perforated web 11, after which the composite structure 23 may be drawn only in the direction necessary for effecting biaxial orientation of the portions of the web 19 which extend over the openings 15 in the web 11, as for example along its transverse axis. In this case, only the ribs extending transversely of the composite film would be uniaxially oriented while the portions of the web directly secured thereto would be biaxially oriented. Such composite film would possess a greater degree of stiffness along its direction of stretch. A similar result could be obtained by bonding spaced strips of unoriented polymeric material to the uniaxially oriented web 19, in lieu of the perforated web 11, with such strip extending in the direction in which the laminated structure 23 is to be stretched.

It is to be understood that changes and variations may be made without departing from the spirit and scope of the invention as defined in the appended claims.

I claim:

1. A method of making a composite polymeric film having molecularly oriented portions including the steps of integrally attaching to an unbroken web of molecularly orientable polymeric material spaced groups of stiffening ribs of like molecularly orientable polymeric material, the ribs of each group of ribs being substantially parallel to each other and extending along one of the longitudinal and tranverse directions of the unbroken web, and stretching the web and integrally attached ribs in directions extending longitudinally of at least certain of said ribs to uniaxially orient the same.

2. A method as defined in claim 1 wherein said unbroken web is oriented in one of its longitudinal and transverse directions prior to providing said stiffening ribs, and wherein said stiffening ribs are disposed at substantially right angles to the direction of initial orientation of said unbroken web.

3. A method of making a composite polymeric film having molecularly oriented portions including the steps of integrally attaching to one side of an unbroken, unoriented web of molecularly orientable polymeric material, stiffening ribs of like molecularly orientable polymeric material said stiffening ribs being disposed longitudinally and transversely of said unbroken web, and stretching the unbroken web along longitudinal and transverse directions to biaxially orient portions of the web and to uniaxially orient the ribs along their respective longitudinal axes.

4. A method of making a composite polymeric film having molecularly oriented portions including the steps of integrally uniting an unbroken, unoriented web of molecularly orientable polymeric material onto a continuous perforated web of like molecularly orientable polymeric material and stretching the united webs along longitudinal and transverse directions whereby the portions of the perforated web extending longitudinally and transversely thereof and the portions of the unbroken web integral therewith are uniaxially oriented along their respective longitudinal axes and the portions of the unbroken web extending over the openings in said perforated web are biaxially oriented.

5. A method as defined in claim 4 wherein the openings in said perforated web are such as to shape the portions therebetween into ribs, each having a narrow part and being wider at its ends.

6. A method as defined in claim 5 wherein the ribs which draw in parallel with each other as the united webs are stretched are shaped to permit the same to stretch to substantially the same degree.

7. A method as defined in claim 5 wherein the ribs which draw in series with each other as the united webs are stretched are of comparable cross-section whereby such ribs will stretch progressively along the film, with stretching being initiated in one of such ribs before a drawn rib in series therewith is drawn to its breaking point.

8. A method as defined in claim 5 wherein the ratio between the widest and the narrowest parts of said ribs is at least equal to the ratio between load required to initiate drawing of such ribs and the load necessary for maintaining such drawing once the ribs have yielded.

9. A method of making a composite polymeric film having molecularly oriented portions including the steps of integrally attaching to one side of an unbroken, unoriented web of molecularly orientable polymeric material groups of spaced integral stiffening ribs of like molecularly orientable polymeric material, said groups of ribs being disposed along planes which extend longitudinally and transversely of said unbroken web, the ribs of each group of ribs being substantially parallel to each other, and stretching the unbroken web at least along one of its longitudinal and transverse directions to thereby uniaxially orient those ribs which extend in the direction of the applied stretching forces and the portions of the film which are located between such ribs.

10. A method as defined in claim 9 wherein the unbroken web of polymeric material is provided with integrally attached stiffening ribs by being laminated to a continuous but perforated web of like polymeric material.

11. A method as defined in claim 9 wherein said ribs are each shaped to be of maximum width at the ends thereof.

12. A method as defined in claim 11 wherein the ratio between the widest and narrowest parts of the ribs is equal to the ratio of the load required to initiate drawing of such ribs and the load necessary for maintaining such drawing once the ribs have yielded.

References Cited by the Examiner
UNITED STATES PATENTS

| | | | |
|---|---|---|---|
| 2,429,177 | 10/1947 | Young | 18—48 |
| 2,545,981 | 3/1951 | Warp | 18—59 |
| 2,740,742 | 4/1956 | Vaughan | 156—229 |
| 2,820,733 | 1/1958 | Sorel | 156—229 XR |
| 3,003,903 | 10/1961 | Vaughan | 161—242 XR |
| 3,012,918 | 12/1961 | Schaar | 156—252 XR |

EARL M. BERGERT, *Primary Examiner.*

MORRIS LIEBERMAN, *Examiner.*

C. B. HAMBURG, P. DIER, *Assistant Examiners.*